Sept. 29, 1959     J. WELSH     2,906,020
PIZZA PIE CUTTER

Filed Nov. 19, 1956     2 Sheets-Sheet 1

INVENTOR.
JOHN WELSH
BY
*J. William Freeman*
ATTORNEY

Sept. 29, 1959   J. WELSH   2,906,020
PIZZA PIE CUTTER
Filed Nov. 19, 1956   2 Sheets-Sheet 2

INVENTOR.
JOHN WELSH
BY
J. William Freeman
ATTORNEY

United States Patent Office 2,906,020
Patented Sept. 29, 1959

2,906,020

PIZZA PIE CUTTER

John Welsh, Akron, Ohio

Application November 19, 1956, Serial No. 623,167

4 Claims. (Cl. 30—114)

This invention relates to pie-cutting devices, and in particular has reference to improvements in pie-cutting devices that are capable of utilization in cutting a freshly baked pizza pie into a given number of sections of equal size.

In the past, several devices have been advanced for effectuating the cutting of a circular shaped pie into a given number of equal sections. At the present time, because of the relative complexity and of attendant expense of mechanical pie-cutting devices, the majority of pie cutting is done by hand on a cutting block by use of a knife that is applied diagonally of the pie. The above manual cutting of the pie into sections is particularly true in the case of a pizza pie, for example. In regard to pizza pie, the same is normally cut while hot, and because of the fact that the same contains a rather viscous cheese substance, there is a tendency for mechanical cutting devices to become clogged with the molten cheese with the result that the mechanical equipment normally employed in cutting ordinary pies at room temperature cannot be utilized in the cutting of a pizza pie because of the fact that the same is cut while hot.

It has also been found expedient in the serving of pizza pies, for example, to make the same in different sizes so as to suit the requirements of different individuals. For example, the normal practice at the present time is to provide pies of two or more different diameters with the larger diameter pie being cut into eight pieces, while the small diameter pie would be cut into four pieces, for example.

As an additional disadvantage of the known prior art, there is no known type of prior art device that can interchangably be used to provide the required number of cuts on these different diameter pies with the result that all pies, regardless of the diameter thereof, must be cut into the same number of sections, with the alternative being to provide two such mechanical cutting devices.

It accordingly becomes the principal object of this invention to provide a mechanical pie-cutting device that has particular utility in the cutting of a hot pizza pie into a given number of sections.

It is the still further object of this invention to provide a mechanical pie cutter for use in cutting hot pizza pies that is characterized by the fact that the same can be easily adapted to cut the pie received thereon into varying numbers of sections.

It is a still further object of this invention to provide a mechanical pizza pie cutter that is self-cleaning in operation, low in original cost, and easy to operate.

It is a still further object of the invention to provide an improved type of pizza pie cutter that operates to cut a hot pie cleanly without tearing or destroying the same at the point of cut.

These and other objects of the invention will become more apparent upon a reading of the following brief specification considered and interpreted in the light of the accompanying drawings.

Figure 1:
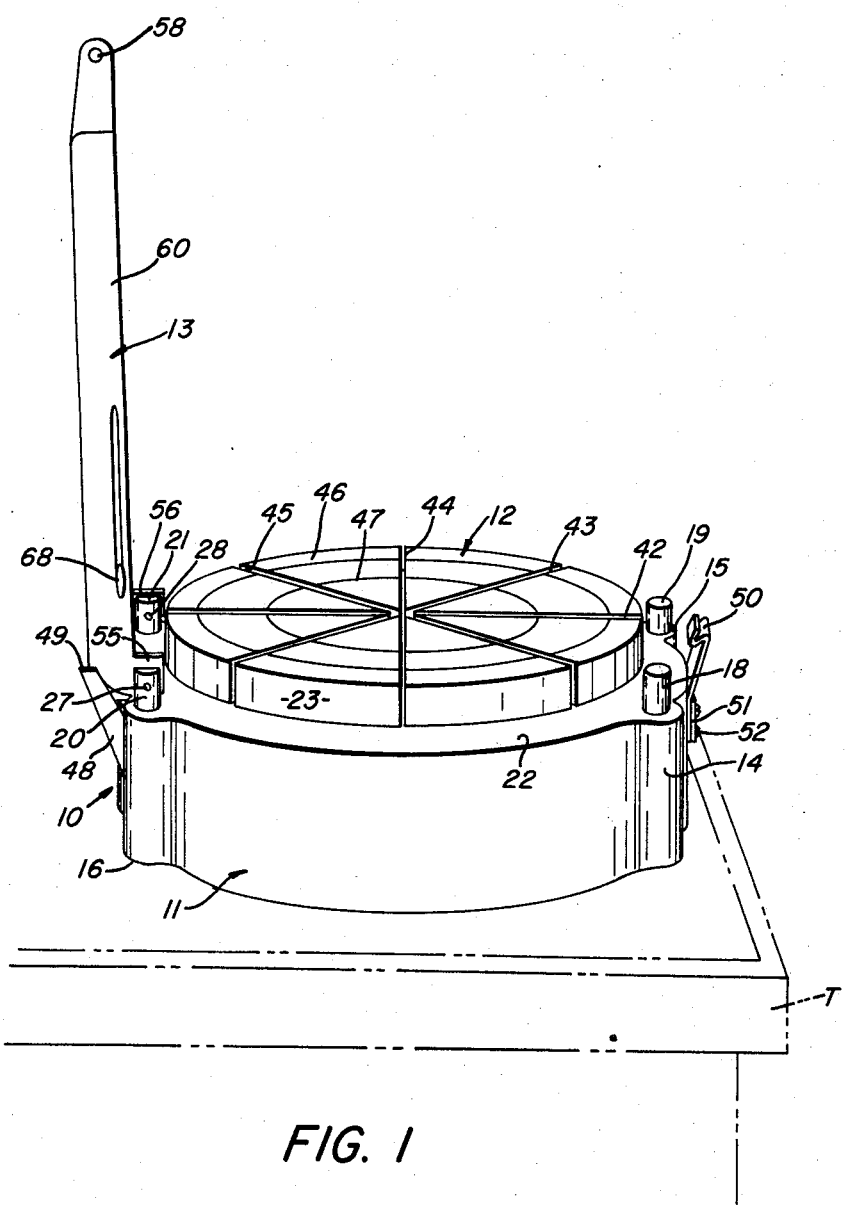
Figure 1 is a perspective view of the improved pizza pie cutter in its open position.
Figure 2:
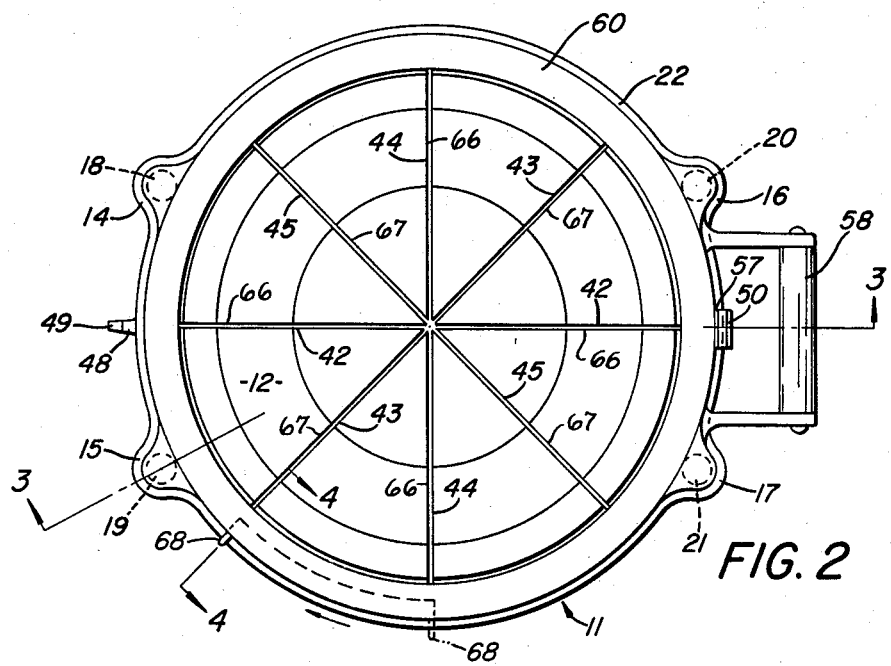
Figure 2 is a plan view of the pizza pie cutter in closed position.

Referring now to the drawings and in particular to Figures 1 and 2 thereof, the improved pie-cutter, generally designated by the numeral 10, is shown including a base 11 that is received upon table T and has a flat elevated cutting surface 12 upon which a pie (not shown) may be cut into a predetermined number of pieces upon movement of a cutting unit 13 to the position of Figure 2.

Figure 3:
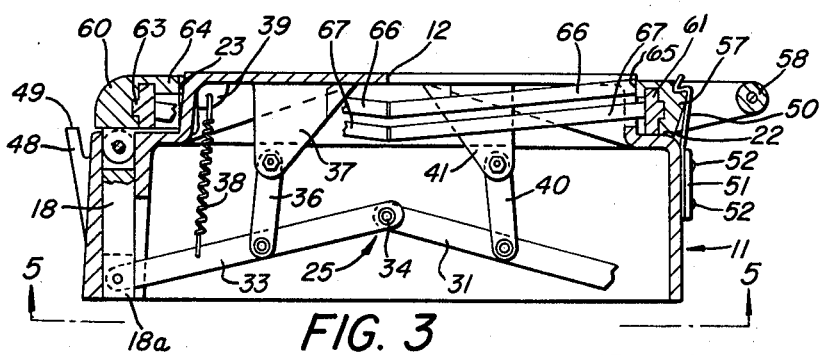
Figure 3 is a sectional view taken on the lines 3—3 of Figure 2.

Considering first the structure of the base 11, it will be seen from Figures 1, 2 and 3 of the drawings, that the same is of generally hollow cylindrical configuration with a series of cylindrical bosses 14, 15, 16 and 17 being provided on the outer peripheral surface thereof for receiving pins 18, 19, 20 and 21 respectively, with these pins projecting above the plane of a shouldered surface 22 and further being capable of being depressed to the condition of Figure 3 upon movement of a toggle mechanism that has been generally indicated by the numeral 25 in Figure 3 of the drawings. In this regard, it is to be noted that while the pins 18 and 19 that are provided on the front portion of the machine, are of the usual cylindrical configuration, the rear pins 20 and 21 are provided with slots to facilitate pivotal mounting, through pins 27, 28, of the cutting unit 13, as will be more fully described in the ensuing paragraphs.

As just indicated, the cylindrical base 11 defines a shoulder or shouldered surface 22 with the elevated cutting surface 12 being spaced, by wall 23, from the shoulder 22 as is best shown in Figures 1 and 3 of the drawings. In the preferred embodiment of the invention, the cutting surface 12, wall 23, and shoulder 22 are as integral components of the base 11 so as to have the surface 12 form an end wall for the cylindrical base 11. It is, of course, to be understood that a separate cutting base could be employed with this cutting surface 12 being attached to the base 11 in any one of several known ways, with the diameter thereof being slightly smaller than the diameter of the base 11 so as to define the shoulder 22 against which the cutting unit 13 can be received as will be presently described.

Figure 5:
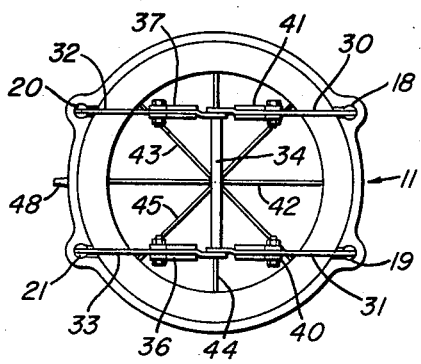
Figure 5 is a view taken on the lines 5—5 of Figure 3.

In order that the pins 18, 19, 20 and 21 may move in unison so as to insure concentric axial movement of the cutting unit 13 with respect to the base 11 and cutting surface 12 as will presently be described, the individual pins 18, 19, 20 and 21 are shown having their respective lower ends 18a, 19a, 20a, and 21a respectively interconnected with link members 30, 31, 32 and 33, the arrangement being such that the link members 30 and 32 connect together at their ends about a shaft 34 while the link members 31 and 33 similarly interconnect around the opposed end about the shaft 34 as is best shown in Figure 5 of the drawings.

Considering the structure of the link 33 as typical, it will be seen that the same is of elongate configuration and receives, adjacent its central portion, a link member 36 that has the free end thereof pivoted to a depending lug member 37 that extends downwardly from the underside of the cutting surface 12. A spring 38 interconnects the link 33 with a lug 39 that is also provided on the underside of the surface 12 as best shown in Figure 3 of the drawings while a similar link 40 interconnects link 31 with a depending lug 41 as is also shown in Figure 3 of the drawings.

Also, as best shown in Figures 1 and 2 of the drawings, the top cutting surface 12 has provided therein a plurality of diametrically extending slots with four such diametrically extending slots 42, 43, 44 and 45 being provided in the preferred embodiment of the invention illustrated herein so as to intersect at the center of surface 12. The individual slots 42, 43, 44 and 45 are shown extending through the cutting surface 12 as well as a great portion of the side-wall 23. In this manner, the cutting blades, as best shown in Figure 3, may pass entirely through the slots on the cutting surface 12 with the result that a self-cleaning action will be effectuated when the component parts are moved to or from the position of Figure 3, so that after the cutting of the pie, for example, the same may be removed from the cutting surface 12 prior to the lifting of the various cutting blades. Also, as shown in Figure 1 of the drawings, the flat cutting surface 12 may be provided with a series of concentric rings 46, 47 that serve to guide the user in locating the pie on cutting surface 12 so that the center line thereof is coincident with the center line of the cutting surface 12. These concentric rings 46, 47 may be painted or otherwise imprinted on surface 12 and may conveniently represent the most common pie sizes.

In addition to the aforementioned component parts, each rear boss 16 and 17 includes an upwardly flaring arm 48 that has a flat end 49, against which the cutting unit 13 may rest when the device is in the open position of Figure 1. Similarly, the front portion of the base 11 also includes a spring-type hook clip 50 that is mounted, through plate 51 and bolts or rivets 52, 52, so as to lock the device in the down, or closed, position of Figure 3.

Turning next to a consideration of the cutting unit 13, it will be seen that the same is of generally circular configuration and has provided thereon a pair of lugs 55, 56 that are respectively received around the pins 27 and 28 that extend through the slotted pins 20 and 21. In this manner, the entire cutting unit 13 may be pivoted as a unit with respect to the base 11. Also, the front portion of the cutting unit 13 has a triangular shaped tab 57 provided thereon for facilitating the reception of the just described spring clip 50, while a handle 58 is also provided on the front portion thereof for facilitating pivotal movement between the open and closed position shown in Figures 1 and 3 respectively.

Figure 4:
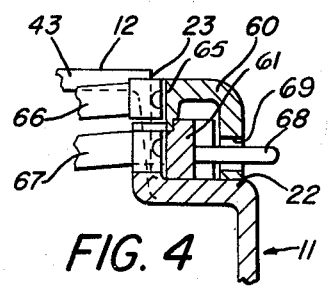
Figure 4 is a fragmentary section taken on the lines 4—4 of Figure 2.

As previously indicated, and as best shown in Figures 3 and 4 of the drawings, the cutting unit 13 is of cylindrical configuration and to this end includes an outer cylindrical ring 60 as well as an inner cylindrical ring 61 that is telescoped with respect to the outer ring 60 with a rib and groove arrangement, designated as 63, being provided between these members to facilitate relative rotational movement therebetween.

To the end of effectuating the required cutting action, the outer ring 60 includes a radially inwardly extending flange 64 that defines a central aperture 65 from which projects a plurality of cutting bars generally indicated by the numeral 66 in Figure 3 of the drawings, with four such cutting bars being contemplated in the preferred embodiment of the invention disclosed herein. A second set of similar cutting blades 67, 67 extend radially inwardly from the inner radial face of the inner ring 61 and may be located beneath the blades 66, 66 if desired. These blades 66, 66, as well as the blades 67, 67, may taper or incline toward the center as shown in Figure 3 or may, if desired, extend parallel to surface 12.

To facilitate such relative rotation, the ring 61 has a projecting arm 68 that extends radially outwardly for projection through an aperture 69 that is provided in the outer ring 60 so as to facilitate 90° rotational movement of the ring 61 with respect to the outer ring 60. In this manner, the rings 60 and 61 may be moved relatively of each other so that the blades 66, 66 may either be superimposed over the blade 67, 67 as shown in Figure 3, or upon 45° movement these blades may be disposed 45° from blades 66, 66 as shown in Figure 2 of the drawings. Accordingly, by merely shifting the projecting arm 68, a pie placed on the surface 12 can be either cut into four or eight segments, as desired.

In use or operation of the improved pie cutting device, the same is first opened to the position of Figure 1 and at this time, the pie is placed upon the flat cutting surface 12 and the outer periphery thereof aligned with respect to the appropriate circle 46, 47 on this surface. At this time, it is merely necessary that the handle 58 be moved downwardly and to the right of Figure 1 so that the appropriate edge portions of the outer ring 60 will simultaneously come into contact with the projecting ends of the pins 18, 19, 20 and 21. Upon the application of equalized pressure to these respective pins, the toggles 30, 31, 32 and 33 will move downwardly about the pivot point defined by the link members 36 and 40. Such movement will be against the force of the individual springs 38, 38 and it is apparent that upon equalized movement, the shaft 34 will move upwardly within the housing defined by the base 11 so as to permit the ends of these pins to move downwardly in unison. Upon downward movement, it is believed apparent that the respective tapered blades 66, 66, and 67, 67, will pass progressively through the pie and the appropriate slots provided in the cutting surface 12, to thereby cleanly sever or cut the pie thereon into a predetermined number of segments.

In this regard, it is to be noted that if the pie is to be cut into four pieces, for example, the blades 66, 66 will be arranged so as to superimpose the blades 67, 67. However, if it is desired that the pie be cut into eight pieces, it is merely necessary that the lug member 68 be moved clock-wise 45° as seen in Figure 2 for example, at which time the blades 67, 67 will be moved 45° with respect to the blades 66, 66 and at this time, the pie will be cut into eight sections with the blades 67, 67, for example, being received in the slots 43 and 45 while the blades 66, 66 would be received in the slots 42, 44. When the blades have passed through the slot as just described, it is apparent that a self-cleaning operation will have occurred automatically, with the spring clip 50 automatically engaging the lug 57 so as to lock the device in the down position of Figure 3.

At this time, a spatula, or other device, may be inserted between the cut pie and the surface 12, and the pie removed, at which time, the spring 50 may be released and the handle 58 removed upwardly towards the position of Figure 1. At this time the cutting surface of the board will be completely clear of any cuttings or molten cheese.

It will be seen from the foregoing how there has been provided a new and novel type of improved pie cutter that is characterized by the extreme simplicity with which the same operates.

It has been shown how the provision of concentric cutting rings permits easy adjustment to cut the pie into a predetermined number of pieces and how this feature permits the device to be interchangeably used with various diameters of pies to be cut.

It has been shown further how the straight line approach of the improved pie cutter permits a free and easy cut to occur with the self-cleaning being effectuated as a result of the relatively thin cutting blades passing through appropriate slots provided in the cutting surface.

While a full and complete description has been made in accordance with the dictates of the patent statutes, it is understood that the invention is not so limited.

Accordingly, where appropriate modifications may be restorted to without departing from the spirit hereof or the scope of the appended claims.

What is claimed is:

1. A pie cutter comprising a base and a cutter frame pivotally secured to said base for swinging movement to and from a position overlying said base, said base including a plurality of upstanding pins mounted for axial shifting movement and engageable by said cutter frame when in said base-overlying position, a shouldered surface on said base, a flat cutting surface disposed centrally of and elevated above said shouldered surface for supporting a pie to be cut, said cutting surface having at least one transverse slot therein, a cutter carried by said cutter frame in alignment with said slot, spring means normally urging said pins to a projected position above said shouldered surface, and means interconnecting said pins for uniform axial shifting movement, whereby pressure on said cutter frame when said frame overlies said base causes said pins to move downwardly in unison from their normally projected position to thereby cause said cutter to enter said slot in said cutting surface and sever a pie thereon.

2. A pie cutter as set forth in claim 1 wherein said cutting surface has a plurality of slots therein, said cutter frame comprises a pair of rings each carrying a said cutter, and means for relatively adjusting said rings to position said cutters either adjacent each other or spaced from each other, to thereby respectively align both said cutters with one of said slots for cutting a predetermined number of pie pieces or to align each cutter with a different slot for cutting a predetermined greater number of pie pieces.

3. A pie cutter as set forth in claim 1 wherein said cutter is inclined relative to said flat cutting surface when said cutter frame is in base-overlying position, whereby a pie on said cutting surface is progressively severed by said cutter as the same passes downwardly into said slot.

4. A pie cutter as set forth in claim 1 wherein said cutter frame comprises an annular ring, said cutter carried thereby extends diametrically thereacross, said cutting surface is of circular configuration and of lesser diameter than the internal diameter of said ring, and said slot is of greater depth than the height of said cutter, whereby said cutter passes beneath said cutting surface and said ring surrounds said cutting surface and overlies said shouldered surface following a pie cutting operation to permit the severed pie pieces to be removed from said cutting surface before withdrawal of said cutter from said slot.

References Cited in the file of this patent

UNITED STATES PATENTS

| | | |
|---|---|---|
| 850,022 | Lewis | Apr. 9, 1907 |
| 862,228 | Wright | Aug. 6, 1907 |
| 1,453,367 | Shipplock et al. | May 1, 1923 |
| 2,010,379 | Scalise | Aug. 6, 1935 |
| 2,801,663 | Lindauer | Aug. 6, 1957 |